US008655761B2

(12) United States Patent
Sah et al.

(10) Patent No.: US 8,655,761 B2
(45) Date of Patent: Feb. 18, 2014

(54) GEOGRAPHIC AND KEYWORD CONTEXT IN EMBEDDED APPLICATIONS

(71) Applicant: Google Inc., Mountain View, CA (US)

(72) Inventors: Adam Sah, San Francisco, CA (US); Michael Thompson, Henderson, KY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/968,848

(22) Filed: Aug. 16, 2013

(65) Prior Publication Data

US 2013/0339148 A1   Dec. 19, 2013

Related U.S. Application Data

(63) Continuation of application No. 13/430,317, filed on Mar. 26, 2012, now Pat. No. 8,515,843, which is a continuation of application No. 12/173,594, filed on Jul. 15, 2008, now Pat. No. 8,145,521.

(51) Int. Cl.
*G06Q 40/00* (2012.01)

(52) U.S. Cl.
USPC .............................. 705/35; 705/14

(58) Field of Classification Search
USPC .............................. 705/14, 35–40
See application file for complete search history.

(56) References Cited

U.S. PATENT DOCUMENTS

| 2005/0149395 A1 | 7/2005 | Henkin et al. |
| 2005/0165904 A1 | 7/2005 | Mooney |
| 2007/0100690 A1 | 5/2007 | Hopkins |
| 2008/0027799 A1 | 1/2008 | Hao et al. |
| 2008/0086368 A1 | 4/2008 | Bauman et al. |
| 2011/0197285 A1* | 8/2011 | Ginter et al. ............ 726/27 |
| 2012/0221421 A1* | 8/2012 | Hammad ................. 705/16 |
| 2013/0054509 A1* | 2/2013 | Kass et al. .............. 706/55 |

FOREIGN PATENT DOCUMENTS

| CN | 101520782 | 9/2009 |
| JP | 2007-122235 | 5/2007 |
| JP | 2008-097351 | 4/2008 |
| WO | WO 2004/010322 | 1/2004 |
| WO | 2004/028234 | 4/2004 |
| WO | WO 2005/065237 | 7/2005 |
| WO | 2007/123783 | 11/2007 |
| WO | 2007/145775 | 12/2007 |

OTHER PUBLICATIONS

International Search Report for International Application No. PCT/US2009/050725, dated Mar. 2, 2010, 11 pages.
Chinese Office Action in Chinese Application No. 200980135763.4, issued Jun. 9, 2013, 11 pages.
European Communication for EP Application No. 09798712.7 dated Aug. 16, 2013, 7 pages.
Office Action in Japanese Application No. 2011-518884, mailed Nov. 26, 2013, 7 pages (with English translation).

* cited by examiner

*Primary Examiner* — Thu Thao Havan
(74) *Attorney, Agent, or Firm* — Fish & Richardson P.C.

(57) ABSTRACT

A computer-implemented method includes generating, using an embedded client application, a keyword context for a container document holding the embedded client application; generating, using the embedded client application, a geographic context associated with a device on which the container document is displayed; submitting the keyword context and the geographic context to a remote server; and displaying an interactive application using information obtained in response to the submission of the keyword context and geographic criteria.

20 Claims, 9 Drawing Sheets

US 8,655,761 B2

GEOGRAPHIC AND KEYWORD CONTEXT IN EMBEDDED APPLICATIONS

CROSS-REFERENCE TO RELATED APPLICATIONS

This application is a continuation application of and claims priority to U.S. application Ser. No. 12/173,594, filed on Jul. 15, 2008.

TECHNICAL FIELD

This document discusses mechanisms and techniques for incorporating information into embedded applications such as gadgets, where such information may include keywords for a document within which the applications are embedded along with geographic information for users of the applications.

BACKGROUND

Targeted web advertising has become a very successful business for companies like GOOGLE. Such advertising is a success for much the same reason certain search engines are a success—it brings users information that is relevant to them. Advertising is typically provided along with search results, often in an area separate from the actual results themselves. In such a situation, the advertisements selected for display may be matched to terms in the search request. The GOOGLE ADWORDS service is an example of such targeted advertising.

Targeted advertisements may also be delivered apart from search, such as on web pages themselves. For example, an ad system may analyze the content of a web page to determine important words or concepts to associate with the page, and may deliver ads directed to those words or concepts when the page is displayed. Such delivery may occur when the page is retrieved for a user, with the host of the page delivering the page content and the ad server delivering the targeted advertising. The GOOGLE ADSENSE service is an example of such targeted advertising.

SUMMARY

This document describes mechanisms and techniques that may be employed to provide information from external sources to web-based documents such as web pages. For example, a web page or a program may act as a container document for an embedded application such as a gadget or widget. The application may include code that determines the context for the application, such as keywords associated with the container document and the location of a user viewing the container document. Where the application is an embedded advertisement module and the container document is a web page, such information may be passed to a system such as a live auction system so as to obtain real-time information that can be presented to a viewer of the document, including, for example, items currently up for auction relating to the topic of the web page and in the geographic vicinity of the user.

In addition, the embedded application may be programmed to format the information and may include additional features such as an interactive map or maps that show the locations of sellers of products displayed with the advertisement. The embedded application may display images of the item and other information related to the item such as the price, description, reviews, star ratings for the item, and any pertinent attributes. Also, if the results returned to the embedded application are insufficient or too voluminous, the application may adjust its request for information so as to obtain an appropriate amount of such information.

Such systems and techniques may provide one or more advantages in certain implementations. For example, advertisements may be conveniently built on the fly in a web page as it is loaded, where the advertisement may be particularly directed to the page (and indirectly to the viewer of the page, who is presumed to have an interest in the topic of the page) and to the location of the user. Such targeted material may be particularly relevant to the user, and may thus improve the user's experience. As a result, the user may also be more likely to respond to the material, such as by clicking on a displayed advertisement, the advertiser will benefit by achieving better conversion rates as compared to other methods, and the advertising network (which may be compensated on a CPC basis) also will benefit. Also, because the embedded application can be programmed to conduct much of the information retrieval and formatting, additional logic may be employed and used as the display is built, such as logic to ensure that information to be displayed to a user is complete and accurate.

In one implementation, a computer-implemented method can comprise generating, using an embedded client application, a keyword context for a container document holding the embedded client application; generating, using the embedded client application, a geographic context associated with a device on which the container document is displayed; submitting the keyword context and the geographic context to a remote server; and, displaying an interactive application using information obtained in response to the submission of the keyword context and geographic criteria. The container document can comprise a web page and the embedded client application can run in an iFrame on the container document. Also, the remote server can include an item search system that returns information about items for sale, wherein the items correspond to the submitted keyword context and are sold in or near an area corresponding to the submitted geographic context.

In certain aspects, generating the keyword context can comprise submitting information about the container document to a remote keyword server, where the information about the container document can comprise a URL for the container document. In addition, generating a geographic context can include obtaining a current location indicator for the device. Also, the remote server can include an ad server that provides advertising content targeted at particular keywords and locations, and the method can further comprise displaying information about a plurality of active databases and permitting a user to select a database listing to be taken to a listing detail page at the remote server. The method can also comprise submitting information about the container document to a remote keyword server and analyzing the information obtained in response to the submission to the remote keyword server, and submitting alternative information to the remote keyword server if the analysis indicates that the information obtained is inadequate.

In some aspects, the alternative information can include the original information, submitted to a second remote keyword server. The method can also include combining information received in response to submissions to multiple keyword servers. Submitting the keyword context and geographic context can include submitting multiple related queries to a remote server, and wherein displaying an interactive application can include rendering query results incrementally and at least in part substantially concurrently with the submission of one or more of the multiple queries. The multiple related queries can comprise queries to refine prior results for updated display, and the queries to refine prior results can be performed asynchronously with respect to each other. The queries to refine prior results can also include follow-up queries that delete search terms from prior queries, and the method can further comprise cleansing the keyword context by applying normalization, whitelisting, and/or blacklisting, or cleansing the geographic context by applying fuzzing and/or shifting to the geographic criteria.

In another implementation, a recordable media is disclosed that has recorded and stored thereon in tangible form, instructions. The instructions, when executed, perform actions that can comprise generating, using an embedded client application, a keyword context for a container document holding the embedded client application; generating, using the embedded client application, a geographic context associated with a device on which the container document is displayed; submitting keyword and geographic parameters associated with the keyword and geographic contexts to a remote server; and, displaying an interactive application using information obtained in response to the submission of the keyword and geographic parameters. The media can also store instructions that, when executed, generate a keyword parameter by identifying an address for the container document and submitting the address to a remote topical server that catalogues topics for container pages. In some aspects, executed instructions display information about a plurality of live auctions and permit a user to select an auction listing to be taken to an auction detail page at the remote server.

In yet another implementation, a computer-implemented system comprises a web-accessible container document for display by a client application, and an advertising embedded application for display with the container document. The application includes computer code to identify keyword context information of the container document and geographic context information of a client corresponding to the container document, to submit the keyword and geographic context information to a third-party server, and to generate an advertisement using information returned from the third party server. The application can be configured to obtain a URL of the container document and submit the URL to a remote keyword server to obtain one or more keywords corresponding to the container document.

In some aspects, the application can also include code to identify keyword context information by submitting an identifier for the container document to a remote keyword server. Also, the third-party server can include a real-time auction server, and the generated advertisement can show items currently on sale by the real-time auction server.

In another implementation, a computer-implemented system is disclosed. The system comprises a web-accessible container document for display by a client application, an embedded application for display on the container document, and means associated with the embedded application for determining keyword and location contexts for the container document, submitting keyword and location parameters associated with the keyword and location contexts to a remote server, and generating a display on the container document using information received in response to the submitted keyword and location contexts.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
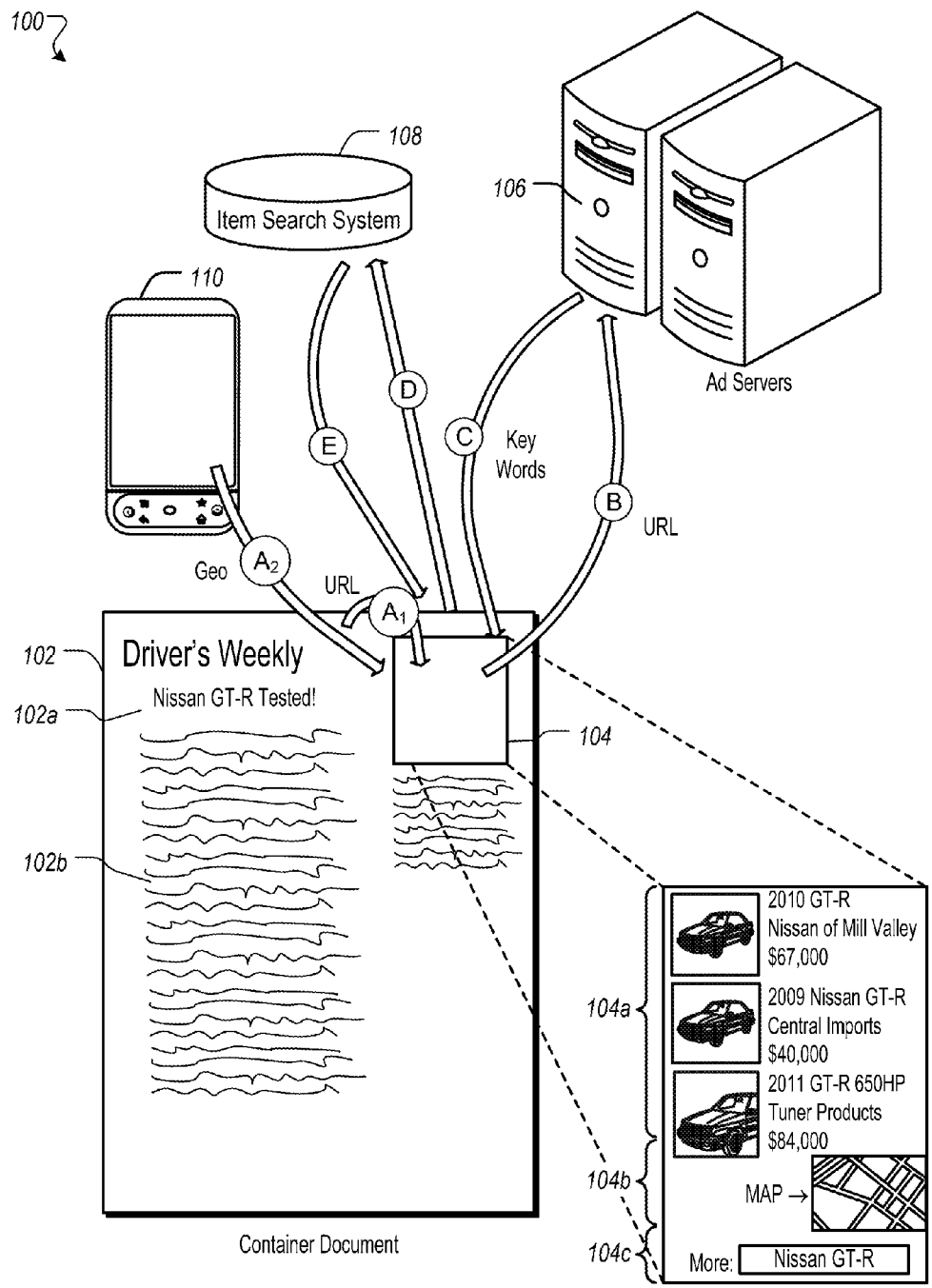
FIG. 1 shows a conceptual diagram of a system and process for delivering real time information to an embedded application.

FIG. 1 shows a conceptual diagram of a system 100 and process for delivering real time information to an embedded application. In the pictured example, the system 100 includes an embedded application 104 (such as a web gadget or a widget) in the form of a portable program module running on a mobile device 110, ad servers 106, and an item search system 108. In general, these components cooperate to permit advertisements or other such displays containing data, to be constructed and displayed to a user at run-time, where the data is targeted to the context of the system 100. Such targeting may be directed, for example, to selecting content for the embedded application where that content is directed to a location of the device 110 and to the content of the container document 102. As such, a targeted advertisement may be constructed on the fly, and may thus contain information that is currently relevant to the user, including to the content of a web page the user is reading and to a location in which the user currently resides. In this example, that information is status information about one or more on-line auto auctions in the user's vicinity relating to content of a web page.

In addition, in certain implementations, the system 100 may be implemented with few or no adjustments to existing systems. For example, the embedded application 104 may be programmed to submit standard HTTP requests to the ad servers 106 and item search system 108 using agreed-upon API's that are in the same format as requests made by other systems. Also, geographic information may be obtained from the device 110 using standard techniques, such as by accessing GPS information through a device operating system, or by looking up the location currently associated with device's IP address. As such, the functionality described here may be added to a system without having to update server software or make other similar changes. In addition, such a system 100 may provide additional flexibility, where authors and users of embedded applications may have more control over the manner in which their systems interact with ad servers 106 and item search system 108.

Such techniques may, in certain implementations, provide one or more advantages. For example, in the example of FIG. 1, a page may be able to provide viewers with up-to-date real-time information that may be particularly relevant to a user. As one example, users may be reticent to click on an advertisement if it simply shows static information about an auction site (e.g., just the name of the site and general information about the type of goods that can be purchased at the site). However, if the advertisement shows goods that may be desired by the user (e.g., as determined by a user profile or the content of a page the user is viewing), shows goods that can be acquired easily in the user's area, and/or shows up-to-date information about such goods, the user is much more likely to select the advertisement, and to follow through with a transaction.

The example implementation may thus have advantages to users, to advertisers, to advertising carriers, and to information providers. Users gain because they are provided with information that is more relevant to them. Advertisers gain because they can drive more viewers to their goods. Advertising carriers, such as GOOGLE, gain because the advertisers that they serve gain and because more effective ads free up additional resources and inventory for other advertisers. And information providers—the owners of the documents that contain the gadget ads—gain because their viewers gain, and perhaps because they can obtain a share of the advertising revenue.

Referring more specifically to FIG. 1, an embedded application 104 is shown located in a container document 102. The embedded application 104 may include a display that is generated from mark-up code that is stored as part of, or referenced from, mark up code that generates the container document 102. For example, the mark up code may include various forms of HTML code, such as code for generating a gadget on the display. The embedded application 104 may be part of an iFrame on a web page that is represented by the container document 102. In general, an iFrame is an HTML document that may be embedded in another HTML document, using an iFrame element. The document in which the iFrame is embedded—the container document 102 in this example—may be generated around the iFrame while the iFrame itself is still being generated.

Example HTML code for providing an iFrame in a web page includes the following:

<html> . . .
<iframe src="http://makinganiframe.com" height="100" width="200" frameborder="0" scrolling="no">
</iframe>
. . .
</html>

As this code shows, the iFrame element may reference a document to be inserted in the iFrame, dimensions for the iFrame, and whether scrolling should be allowed inside the iFrame. The document in the iFrame can be replaced with another document or can be modified or refreshed without refreshing the container document (e.g., the surrounding page), by using the "target" attribute of an HTML anchor or by using JavaScript, such as in an AJAX implementation. Similar displays may be generated, for example, through editing of a document's DOM tree.

The embedded application 104 may communicate with the container document 102, with ad servers 106, with the item search system 108, and with other applications on the device 110, including the device operating system. The container document 102 may display a variety of information, and in this case, displays a heading 102a and body text 102b. The container document 102 is also represented by a URL that can be used by the embedded application 104 and other internet-connected components and systems to identify the container document. The embedded application 104 may also use other contextual information, such as a title of the page or the heading 102a in obtaining additional information for its operation.

The embedded application 104 may target itself to the content of the container document 102 by performing textual analysis of the container document 102 on its own behalf and/or using the ad servers 106. For example, the embedded application 104 may be programmed to identify keywords on a page, such as certain terms that are included in a title or particular headings of a page. In this example, the embedded application may recognize the term "Driver's" in the title as being generally relevant to the topics of the page, and the term "Nissan GT-R" as being specifically relevant, since headings are typically more specific than are titles. The embedded application may also look at the text 102b on the page in making such a determination. Certain terms on the page may thus be extracted as keywords for the page, or keywords may be derived from the terms on the page (e.g., the keyword "automobiles" may be derived from "Driver's").

Such analysis may be performed in various manners by the embedded application 104 itself. Alternatively, the embedded application 104 may perform certain analysis and may then provide data to a central server system (not shown) for further processing. For example, the embedded application may generate a text file that includes all the text in headings on a page or all the text on a page, and may forward it to a server for analysis. The server may then identify keywords in the text, and may return such keywords back to the embedded application 104.

In the implementation shown here, the embedded application 104 relies on ad servers 106 to conduct most of the processing. In particular, ad servers 106 may be servers that include components that crawl various web sites and analyze the content of those web sites. For example, the textual content of web pages may be gathered and a list of terms from the page may be generated and ordered from most common terms to least common terms. This list of terms may then be submitted to an expert system that has been trained with other terms and that associates various concepts or keywords with those terms. From such analysis, particular concepts or keywords associated with the web page may be determined, and such concepts or keywords may be passed to the embedded application 104 and used by the embedded application 104 (as described further below) in queries to obtain additional information from third-parties for processing by and display by the embedded application 104.

The embedded application 104 may access such information by making a properly formatted request of the ad servers 106. This request may identify to the ad servers 106 the information that is needed, by providing the ad servers 106 with identifying information for the container document 102, such as the URL for the container document 102. To obtain the URL, the embedded application 104 may use JavaScript so that it may get the URL by document.location. If the JavaScript is running inside an iFrame, it can use a document.referrer to get a URL for the container document 102. The embedded application 104 may then submit the URL to the ad servers 106 by making an HTTP request, such as a request formatted as follows:

http://pagead2.googlesyndication.com/pagead/
ads?url=slashdot.org&outp ut=xml&num_radlinks=10

The ad servers 106 are configured to receive requests relating to particular URLs and to provide, in response, keywords that are descriptive of content associated with the URLs. The ad servers 106 may be configured simply to perform a look up in response to receiving a URL if the keywords have previously been generated through an earlier crawling process, or may identify additional data associated with a received URL before returning descriptive information. The ad servers 106 can look up a crawled copy of the page and conduct a contextual analysis as described above.

The embedded application 104 may also make use of information about a user of the mobile device 110. In one example, the servers 106 can look up an IP address related to a request from the device 110 in a geographic database, and may pass the geographic information (or information gleaned from the geographic information) back to the embedded application 104. In another implementation, the embedded application 104 may obtain the information directly from the mobile device 110, such as by querying an operating system on the device 110, where the device 110 includes GPS functionality or emits radio signals such that the location may be determined by triangulation.

Location information may also be obtained from device 110 storage, such as from a cookie on the device. For example, a different application on the device that provides location-based services to the user of the device 110 may solicit information from a user to determine the user's location (e.g., the user may initially establish a "home" location and the location may be manually updated by the user or may be updated based on subsequent search activity by the user such as the entry of local search terms) and may store that location information. The embedded application 104 may then access the stored information.

Upon receiving the descriptive information (e.g., keywords or topics and location information), the embedded application 104 may submit the received information, a subset of the information, or information relating to the received information to the item search system (ISS) 108. The item search system 108 may take a variety of forms, but in this example is a server that maintains changing real-time information, such as weather, stock price, or auction information. One example of such systems are listing sites on which members of a site may list items for sale to other members of the public. The item search system 108 may operate so as to receive queries via published, open protocols, so that a developer of embedded application 104 may readily communicate queries via the embedded application 104 using the received descriptive information. The item search system 108 may then respond in a known manner, such as by transmitting XML-formatted information about activity tracked by the item search system 108. For example, the item search system 108 may provide descriptive information about top objects in an auction that is associated with the query passed to it, such as descriptions, photos, current prices, ratings, and time to expiration.

Where location, or geographic, information is submitted to the item search system 108, the search for responsive data may be narrowed to a geographic area associated with such information. For example, the query from the embedded application 104 may ask for all auctions having a certain keyword or keywords within a certain mile radius of the user's inferred location. Variations on such requests may also be submitted, as described in more detail below with respect to FIG. 4B. Also, the format of the location information may take a variety of forms, including written addresses, city and state names, zip codes, and lat/long pairs. Any application in the system 100 may use known and relatively simple mechanisms to convert between and among the various forms.

Where geographic information cannot be determined—for example, if a device does not have GPS, the user of the device is not registered with a system, and the device does not contain a relevant cookie that includes geographic information and the device cannot be located by triangulation of radio signals—non-geographical-specific advertisements may be requested by the application 104. Alternatively, a larger best-guess area may be used where there is no geographic information or insufficient geographic information, such as by serving ads across an entire country or other region.

An example flow of operations in system 100 is shown by lettered arrows in FIG. 1. In this particular example, the container document 102 is a web page for an automobile enthusiast site, and the particular page is a test report of the Nissan GT-R automobile. The operator of the web site may provide such very helpful information to the public for free, and may thus depend heavily on advertising revenue to maintain its quality of service. To assist with this challenge, the operator may include embedded application 104 in the container document 102, such as by providing a pointer to code for generating embedded application 104. The operator would not have to code the embedded application 104 himself or herself, but could simply add it as a gadget, similar to an IGOOGLE GADGET, to the page.

When the embedded application 104 is accessed, such as when a user device 110 is provided with mark up code when accessing the container document 102, the code for the container document 102 may first begin to be executed, and the container document 102 may be displayed. When the processing reaches the iFrame code for the embedded application 104, code for the embedded application 104 may be accessed and executed. That code may include elements for accessing information about the container document 102 and the device 110, such as the URL for the container document, the dimensions provided in the container document for the iFrame, and location data for the device 110. Arrow A1 shows a request from the embedded application 104 to the container document 102 to obtain certain information about the container document 102. Arrow A2 shows a request from the embedded application 104 to the device 110 to obtain geographic data for the device 110.

The embedded application 104 may then optionally make a request, such as in the form of an HTTP request, to the ad servers 106 to obtain additional information about the container from the ad servers 106. Such a request is shown by Arrow B. The request may include some or all of the information obtained from the container document 102 and/or the device 110, in either its original form or in a modified form. For example, the request may include the URL for the container document. The request may also include other information, such as the IP address of the user, and any other parameters that the publisher is willing to have passed, such as user demographics for the container document 102 and the like.

The request from the embedded application 104 to the ad servers 106 may optionally be encrypted or otherwise protected from tampering. For example, a unique protocol may be agreed upon between embedded application 104 and ad servers 106 to prevent illegitimate requests for information from ad servers 106, or interception of legitimate requests and responses.

Upon receiving a request, the ad servers 106 may perform a variety of operations in generating a response to the request. In the pictured example, the ad servers 106 are tasked with providing the embedded application 104 with information that is descriptive of the container document 102. The ad servers 106 or other servers associated with the ad servers 106 may have previously generated such descriptive information, such as by the techniques described above (e.g., crawling pages and performing analysis to determine topics, or keywords, for the pages). If such information already exists, the ad servers 106 may simply return it to the embedded application 104.

If the ad servers 106 do not yet have descriptive information for the container document 102, they may attempt to generate such information in real time. For example, they may cause a spider module to access the container document 102 to obtain content from the container document 102 (e.g., the text of a web page along with tags that may indicate the relative importance of the text, such as heading tags), and may extract keywords from the content. Such keywords may then be stored by the ad servers 106 for later use and may also be transmitted back to the embedded application 104.

If the ad servers 106 cannot obtain information that is directly descriptive of the container document 102, then they may attempt to generate a best guess for such information. For example, the ad servers 106 may obtain keywords for other documents at the same domain as the container document 102. The ad servers 106 may then create keywords that are, for example, a ranked union of keywords for other documents that are "near" the address of the container document 102. In one example, documents that are closest to the container document 102 (e.g., those in the same path) may be given higher weight than more distant documents when determining appropriate descriptive information to deliver for the container document 102.

When the descriptive information for the container document 102 is determined by the ad servers 106, it may be returned to the embedded application 104, as shown by Arrow C. For example, the information may be provided in an XML formatted message or other similar message format.

Embedded application 104 may also perform the analysis to identify topics or keywords for the container document 102, or topics or keywords otherwise relevant to embedded application 104. For example, the embedded application 104 may include code for selecting keywords from headings in a document or otherwise determining topics for the document.

Upon receiving the information from the ad servers 106, the embedded application 104 may submit the information, along with other contextual information such as location information, in a query to the item search system 108, as shown by Arrow D. Such an action may simply include inserting keywords received from the ad servers 106 as arguments in a query. Such action may also involve additional steps. For example, the embedded application 104 may make a determination that certain information received from ad servers 106 will not result in a satisfactory result from the item search system 108. As one example, the embedded application 104 may determine that it has too many keywords or keywords for the item search system 108, and may be programmed to remove certain of the keywords (e.g., the last-received keywords or the first received keywords, or by filtering out words that would make the search too limited in scope to obtain a useful number of appropriate results.

The information returned from the ad servers 106 to the embedded application 104 may include information in addition to the descriptive information. For example, the ad servers 106 may determine, by analyzing the descriptive information, that a particular item search system 108, from among many item search systems, may be more appropriate for providing content to the embedded application 104. As one example, where keywords returned to embedded application 104 relate to consumer-directed terminology (e.g., DVD, television, collectibles), the ad servers 106 may provide a parameter so that the embedded application 104 sends a query to a server associated with a particular listing site. On the other hand, if the key words indicate that the user is likely to be looking at a more industrial document (e.g., steel, billet, CRM, etc.), then the embedded application 104 may be directed to an industrial-focused auction site. In this manner, the advertisement shown as a result of the process may be particularly tailored, and also may be directed to a site most likely to give complete and useful results.

In response to a submission by the embedded application 104, the item search system 108 may return results for the query. For example, through a standard API, the item search system 108 may reformat the query for submission to a database, such as a database tracking auction status in real time (which includes near real time). The results may include listings of ongoing auctions, like a user would see if they typed the relevant keywords into a home page of a listing site.

Such information may also include information about the location of each seller in the auction, where the returned results are limited to auctions near the location identified in the request from the embedded application 104. The item search system 108 may return a certain number of results (e.g., in response to a parameter received from the embedded application 104), such as the top three results to the embedded application 104, as shown by Arrow E (e.g., the three closest results to the user, or the three auctions that are about to expire). The results may be formatted, for example, as an XML message.

Upon receiving the results from the item search system 108, the embedded application 104 may analyze and format the results for display to a user on the web page represented by the container document 102. For example, the embedded application 104 may initially determine the size of its associated iFrame so as to determine how many results it can display, and in what format it can display them. For example, if the iFrame is very short, there may no be room for graphics (e.g., photos of items in an auction), and the embedded application 104 may decline to display the graphics in such a situation.

In addition, the embedded application 104 may determine that the iFrame is too small to display a full description of multiple items, and may thus choose to concatenate certain descriptions or to display only a subset of fields received from the item search system 108, such as displaying only a "short description" field for an item. Also, the embedded application 104 may choose to display more items than will fit in the iFrame, and may provide a scroll control to permit access to items that will not initially display. The embedded application 104 may perform other formatting operations also, such as expanding outside of the iFrame to show more items.

In this particular example, the information "Nissan GT-R" in the heading 102a was submitted as a keyword to the item search system 108, along with a location of the device 110 (either inferred, such as from historic location data in a cookie, or explicit, such as a GPS reading). Three ongoing auctions, with their current prices, are displayed in a display for the embedded application (104a). In addition, a map 104b is displayed, where the map corresponds to the location of a particular selected seller from the list of sellers. The user may click on the map 104b to have additional information about that seller displayed and to have the map expand to fill the entire area of the embedded application 104 display area.

Optionally, a search area 104c may be displayed, and may be pre-populated with the search term that was submitted to the item search system 108. The user may thus immediately see what search term was automatically generated for them, and may change or refine the term to obtain additional results in the embedded application or from the originating site. The user may also be provided with the location that was submitted for them and be given the opportunity to change that location or the radius around the location for which the search is relevant.

The gathering of information from the container document 102, the submission of that information to the ad servers 106, the receipt of descriptive information about the container document 102 from the ad servers 106, the submission of a query to the item search system 108, and the receipt and display of results from the item search system 108, may all occur, in appropriate implementations, while the page associated with the container document 102 is being loaded. As such, the display created by the embedded application 104, such as an actively generated advertisement, may be viewable by a user almost immediately upon accessing and loading the associated web page.

The embedded application 104 may also be provided with additional functionality for accessing information for display with the web page. For example, calls made by the embedded application 104 may be conditional or iterative. As one example, the embedded application 104 may request a limited number of results, and when displaying those results, may display a control by which a user may seek additional results (like the search box 104c or another form of control). In such a situation, the embedded application 104 may then request the additional results. (The embedded application 104 could also obtain all of the results initially and store some of the results until the user requests them.) The embedded application 104 may also determine, from information received from the ad servers 106, that multiple item search systems 108 may be possible sources for an advertisement. In such a situation, the embedded application 104 may generate a display showing a user the various choices of item search system 108, and may then perform a query of a particular item search system 108 upon selection of such an option by the user. It should be appreciated that various functions provided by a language such as JavaScript and JavaFX may also be implemented by the embedded application 104, thus enabling a rich array of interactions.

The display produced by embedded application 104 may include metadata, such as hyperlinks, that permits a user to interact with the results. For example, text displaying certain items in an on-line auction may be associated with a hyperlink whose selection by user causes a browser that displays container document 102 to be redirected to a page showing details about the item (or causes a new pane or new window to be open to display the item detail screen).

Selection of such a hyperlink may also cause a message to be transmitted to ad servers 106 or a server associated with ad servers 106, so as to report the user's selection. For example, an advertising system may bill advertisers based on the number of times that users click on a particular advertisement, and such a message may permit an ad system to properly bill an advertiser, such as the operator of item search system 108.

In addition, embedded application 104 may report back the particular item the user selected within the display, so that more detailed reporting and billing may occur. As one example involving an on-line auction system, the seller of an item may be billed by the item search system 108 operating the auction if a user clicks on a link for that item. The item may include an ID number assigned by the item search system 108, and the embedded application 104 may pass that ID number to the ad servers 106 when a user selects the item. The ad servers 106 may then provide the number to the item search system 108 at an appropriate time, such as at a time when the selection is billed to the item search system 108. In addition to the ad servers 106 using such information to pass on advertising costs to their users in a fair and tracked manner, the item search system 108 may use such information to help analyze the effectiveness of providing certain information in a display, among other things.

The requests by the embedded application 104 to the ad servers 106 and to the item search system 108 may be cached in certain implementations. Such caching may permit for increased performance, as the various requests described above may require relatively extensive searching and processing, particularly when performed in very large numbers. For example, if an embedded application for an advertisement like that discussed above is placed on the front page of the www.nyt.com web site, there may be hundreds of thousands of page loads that would each require complete searching and processing by the ad servers 106 and the item search system 108. Caching may allow the search and processing to occur once, with subsequent requests being served simply by looking them up in the cache.

When such caching occurs, it may be implemented at various levels, including in the browser, at an ISP or corporate server, and at central information providers such as GOOGLE. At the browser, when a user returns to a web page that is a container for an embedded application like that described above (e.g., when returning to a newspaper's main home page after reading an article), the module code may simply return the information that it obtained the first time the page was loaded. Caching at an ISP may avoid any need to hit the ad servers 106 or the item search system 108 at all after a first user seeks information from those sources. And caching at the ad servers 106 and item search system 108 does involve some load on those systems, but avoids the need to re-query and re-process in manners that could be much more expensive than simply looking for information in the cache.

Caching may be controlled to expire by various mechanisms, particularly when the data displayed by embedded application 104 is real time data like weather information and on-line auction information. For example, one may insert a timestamp of appropriate granularity to the GET request. In addition, where caching is used or could be used, embedded application 104 may be programmed to format items in anticipation of such caching. For example, if an on-line auction system reports time remaining in auctions as "3 minutes remaining", the embedded application 104 may be programmed to reformat such information into an absolute, rather than relative time, e.g., "expires at 2:23 pmCT."

Figure 2:
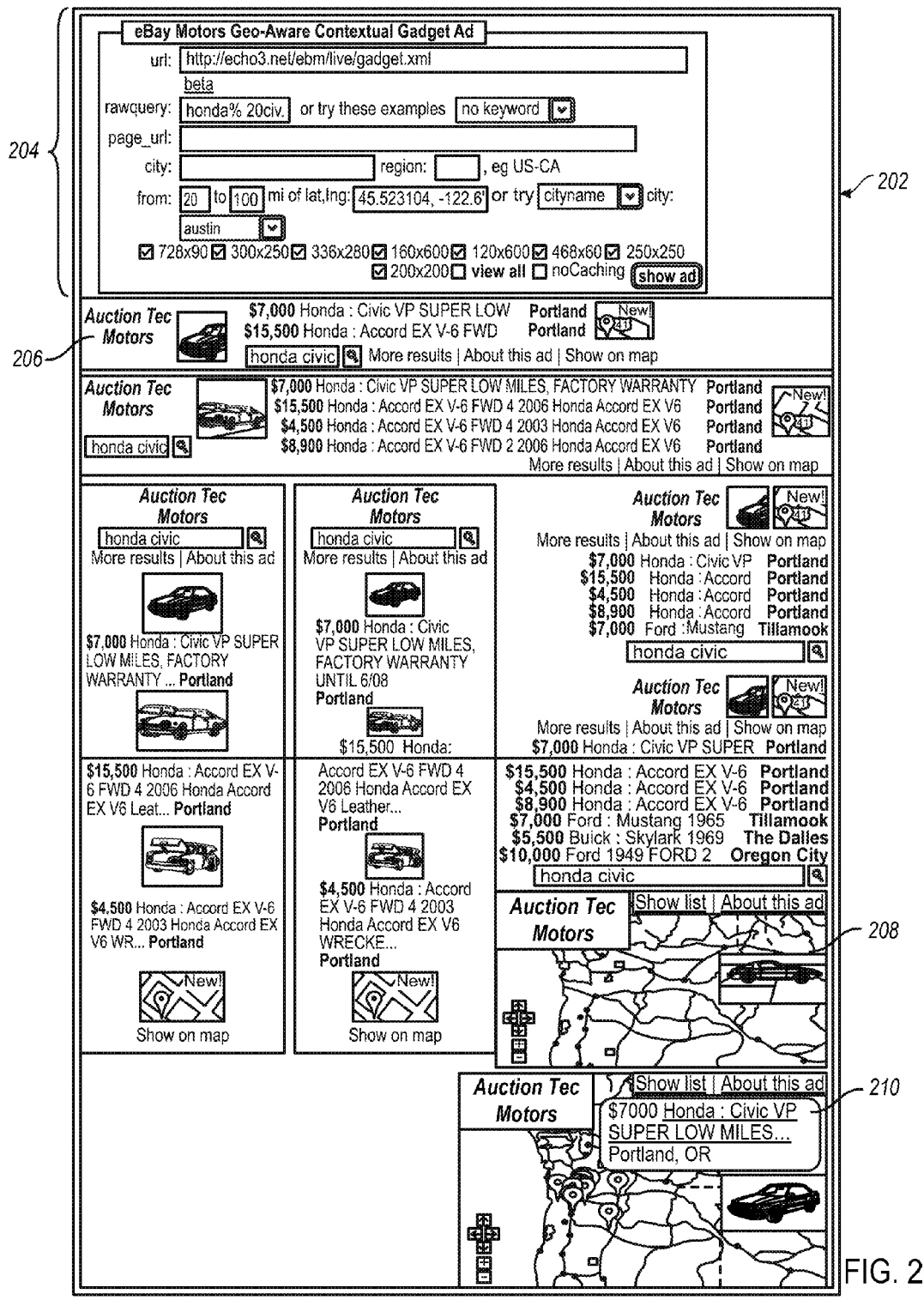
FIG. 2 is an example display of gadget advertisements that can be produced by the system and process of FIG. 1.

FIG. 2 is an example display 202 of gadget advertisements that can be produced by the system and process of FIG. 1. The particular display 202 shows a sort of test bed for contextual gadget ads, where a user can enter particular query terms and location information, and may have current listing information for the terms and the location returned and displayed in a variety of common ad formats. Such a display may be provided to prospective advertisers so that they can test how their ads are likely to be displayed by a system.

An input area 204 allows a user to enter a URL of a web page where ads are to be displayed, along with a raw query that is properly formatted for one or more keywords for a query. The page URL may be used by an ads server as a key to look up topics or keywords for the particular page, which may be useful in generating targeted information for the page. The user may also specify a location in various manners, including by entering a city name, a region code, and a radius range away from a particular city of lat/long coordinate. In one example, a city name may be selected (here, Austin, though the location shown is for Portland), and the application that generates the display 202 may fill in the lat/long coordinates automatically.

The various displays below the input area 204 show what the application generates when a user selects the "show ad" button. Each of the displays contains the same information returned from a listing site showing live auction sales for automobiles with real-time updated pricing and bid information, but in different ad size formats. Display 206, for example, includes two listings (it has limited space), along with an image from the first listing. If the user hovers over the second listing, the image will change to that of the second listing.

A map icon is also shown. If the user selects that icon, the display 206 will be replaced by an interactive map served in familiar fashion by the GOOGLE MAPS service, with specific information for the seller of the selected listing (e.g., seller name and address information in a pop up bubble, along with a pin at the seller's location, and telephone number information that the user may select to complete a click-to-call operation).

Additional controls are shown along the bottom edge of display 206. For example, a hyperlink for "more results" causes other listings (two more in this example) to be displayed to the user, a hyperlink for "about this ad" shows general information relating to the ad and the advertisers, and a "show on map" hyperlink causes the performance of a function similar to that described above for selecting the map icon.

Finally, a search box is shown at the bottom edge near the image, with the search term "honda civic" filled in. The user may change the entry, such as by adding a year to the entry, to make the search that provides information for the display 206 to be more specific. In general, a viewer of display 206 in display 202 may interact with the advertisements just as if they were advertisements in other sorts of container documents, such as a web page for an on-line newspaper or magazine.

Features for the search box may take a variety of appropriate forms. For example, the box may display only keywords or may display keywords and geo information (e.g., a search centerpoint), and additionally may display a radius for a search. The displayed query may either match or not match the query that is actually submitted, such as by displaying [bmw 325i] but submitting [bmw] (plus a location code). Where multiple queries have been run to generate the results, the terms for the most relevant search may be displayed, as measured by the one that returns the most results that are actually displayed in the advertisement Such interaction is shown by displays 208 and 210. Display 208 shows the result if a user first hovers over the 1965 Mustang in the search result and then selects that listing or selects the map icon while that listing is active. In this example, the Mustang listing appears not to have been passed with particular information about the seller or the location of the seller (other than it being in the Portland area). Display 210 shows the result if the user hovers over the first listing and then selects the map icon. In this example, textual information about the listing and the seller can be shown, in a manner that should be familiar to users of GOOGLE MAPS. Also, pins are shown at locations associated with the listing, which here may be the locations of multiple facilities for a particular dealers.

In certain implementations, each pin may represent one listing, and the detail information and image may change as the user moves the cursor over each individual pin. A map view of search results may also be shown initially, and the mode in which results are initially displayed (text, map, or mixed) can depend on a variety of factors, including context (e.g., which page it is on, including via page-owner preferences), channel (when displayed in an ad, the results may be shown in text, but if displayed on a maps site, they may be displayed in a map), and user choice (e.g., where an application can determine that a user previously indicated a choice, either explicitly or implicitly).

In other applications, each of the locations being mapped may be locations for a common merchant. For example, an advertisement for coffee may be shown and a corresponding map may be populated with pins showing the coffee shops for one particular company in the area.

Using these ad formats, in addition to giving the user specific location information that may be particularly useful to them, the user can also be presented with a display by which they will know immediately that they can reach a desired auction without any effort. Specifically, they will not need to enter additional search requests after clicking on an ad and being taken to the listing web site. As a result, the presentation of an ad shown here may cause the user to react in a much more positive manner, i.e., to appreciate the ad more and to be more likely to click on it. As a result, the user may benefit by being directed to information that interests them, the advertiser listing site (and its corresponding automobile sellers) may benefit by driving additional traffic to auctions, a syndicator of the advertisement can benefit by generating ad revenue, and the producer of the container document can benefit by sharing in advertising revenue and having a more pleased user base.

Figure 3:
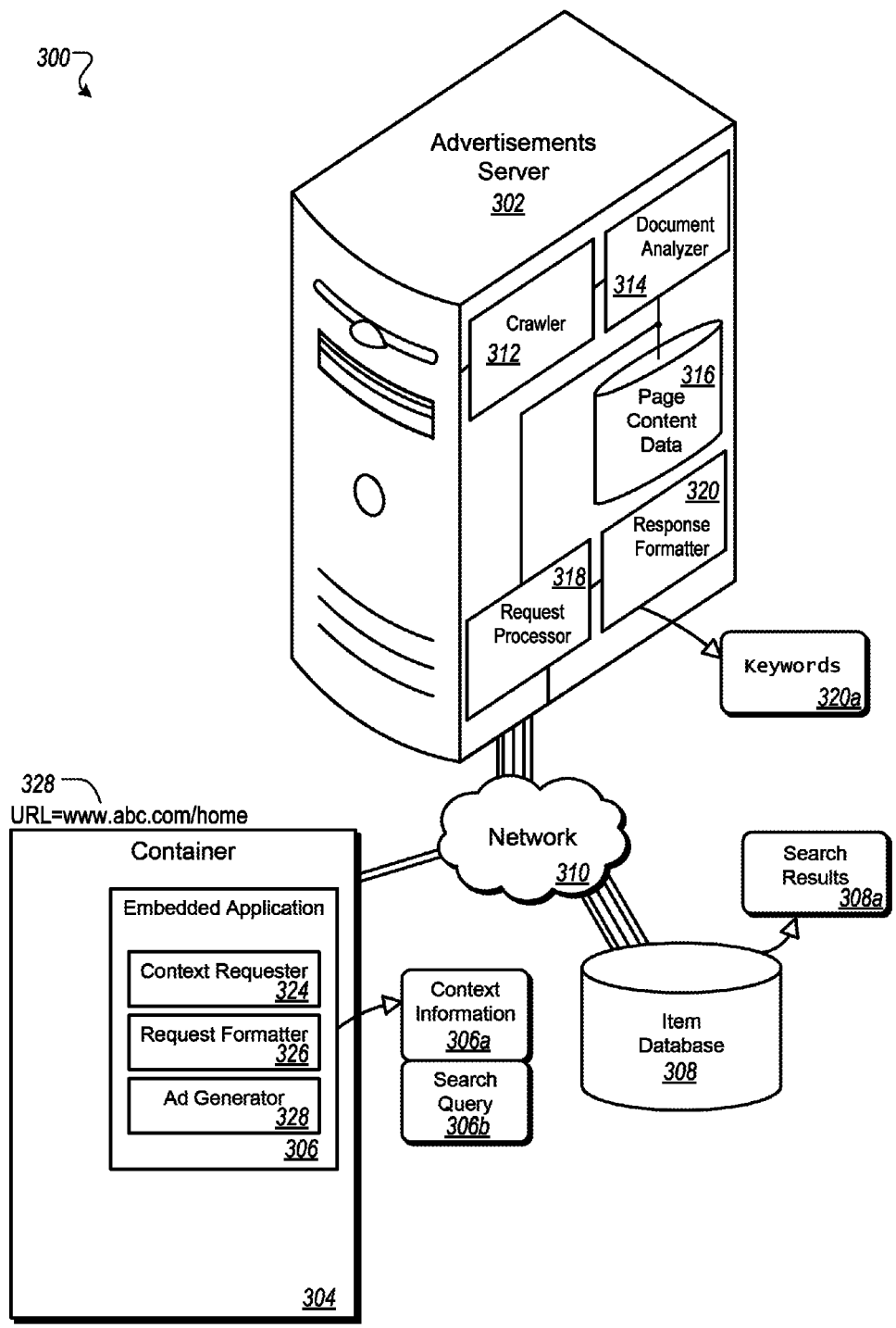
FIG. 3 is a schematic diagram of an example system for delivering content in real time to embedded applications.

FIG. 3 is a schematic diagram of an example system 300 for delivering content in real time to embedded applications. In general, the components shown in FIG. 3 may take a form, in some implementations, similar to those shown in FIG. 1. Additional detail and structure for certain of the components is shown here for additional illustration of the operation of the example system 300.

The system 300 is generally made up of an embedded application 306 in a container document 304, that may access information through a network 310 such as the internet, from an ads server 302 and an item database 308. The container document 304 may have a number of parameters associated with it, including its URL 323. The embedded application 306 includes code and a resulting display that is embedded in the container document 304, and may include code (e.g., JavaScript code) that is referenced from the container document 304. As described above, the embedded application 306 may be implemented to provide a display in an iFrame on a web page associated with the container document 304.

The embedded application 306 includes a number of components that permit it to obtain information about the container document, and other contextual information, and to retrieve and display content such as a dynamically generated ad, using such information. For example, context requester 324 is a program module that communicates with the container document 304, such as by communicating with a browser program displaying the container document. The context requester may obtain various parameters that define the context of the embedded application 306, such as a URL 323 for the container document 304 and a size of a frame in which the embedded application 306 is to be displayed, among other things. The context requester 324 may also obtain data from the device that is displaying the container document 304, such as location information for the device or user of the device.

The embedded application 306 also includes a request formatter 326. The request formatter 326 may be used to generate requests for the ads server 302, such as using context information (e.g., a container document URL) obtained by context requester 324. In addition, the request formatter 326 may receive responses from the ads server 302, and use information in such responses to generate a request or requests to the item database 308, e.g., a query designed to generate a list of items showing real time information tracked by item database 308, for display by embedded application 306.

The embedded application 306 can also include an ad generator 328. The ad generator 328 receives information such as that returned from item database 308, including real time information, and formats the received information for display on a web page associated with the container document 304, in manners like those discussed above.

The embedded application 306 can generate various forms of messages to be communicated to and over the network 310. Message 306a is a message, in the form of a request (e.g., HTTP request) to ads server 308 including context information relating to the context of the embedded application 306 that has been gathered by the embedded application 306. Message 306b is a search query, which may be submitted in a form according to a standard API to item database 308 (or to a web server associated with item database 308), and may include, for example, keywords and location-based context information.

Item database 308 itself may take a variety of forms consistent with the techniques described here. In certain implementations, item database 308 may track real time, constantly changing information. In such implementations, embedded application 306 can be used to gather such information and dynamically generate content, such as advertisements, to be displayed on a web page associated with container document 304. The item database 308 may generally be configured to generate messages in the form of search results that are responsive, for example, to search queries from the embedded application 306. Other messages may also be generated and transmitted by item database 308 as appropriate.

Ads server 302 may include a number of components and structures for supporting the generation of targeted advertisements to viewers of internet web pages. The advertisements may be generated for inclusion on pages of an organization that operates the ads server 302 (e.g., search result pages) or may be generated for inclusion through a syndication program on third party web pages. As with the other devices here, the ads server 302 may include one or more different computers and/or computer systems; the particular grouping of modules and structures is shown here simply for illustrative purposes.

The ads server 302 receives messages from other components at a request processor 318. The request processor 318 may parse and analyze incoming messages to determine how to respond. For example, an incoming message may request a list of certain concepts or keywords associated with a particular URL, and the request processor 318 may analyze the structure of such a request to determine that certain identifying information about a web page associated with the URL should be returned. As such, the request processor 318 may access page content data 316, which includes information that correlates particular URL's to concepts or keywords. The accessing may be through a simple look up that uses the URL as a key.

The page content data 316 may be generated in the first instance by a document analyzer 314 using a crawler 312 to obtain page information. The crawler may operate through various mechanisms to automatically and periodically survey information available through network 310. The document analyzer 314 may review information collected by the crawler 312, and may determine concepts or keywords for the information using mechanisms like those discussed above. The document analyzer may also obtain URL's for various documents that it analyzes from the crawler 312, and may store the URL's and the corresponding concepts or keywords in page content data 316 for later access by the system. In addition, the crawler 312 and document analyzer 314 may obtain and analyze information in real time, such as where a request is made for a URL from the embedded application 306, and a corresponding URL does not yet appear in the page content data 316.

When responses have been generated, they may be returned to a requester by response formatter 320. The response formatter 320 may, for example, reformat database results received from a query of the page content data 316 into one or more XML messages to be returned to the embedded application 306. The messages may include, for example, keywords 320a. Various other services may also be provided by ads server 302, though limited services have been shown here to increase clarity. For example, static ads may be served up by ads server 302 and may be delivered for display on a web page associated with container document 304—without the need to reference a separate source of real-time information like item database 308. Other services may also be provided, as may be described more fully with respect to FIG. 7 below.

Figure 4A:
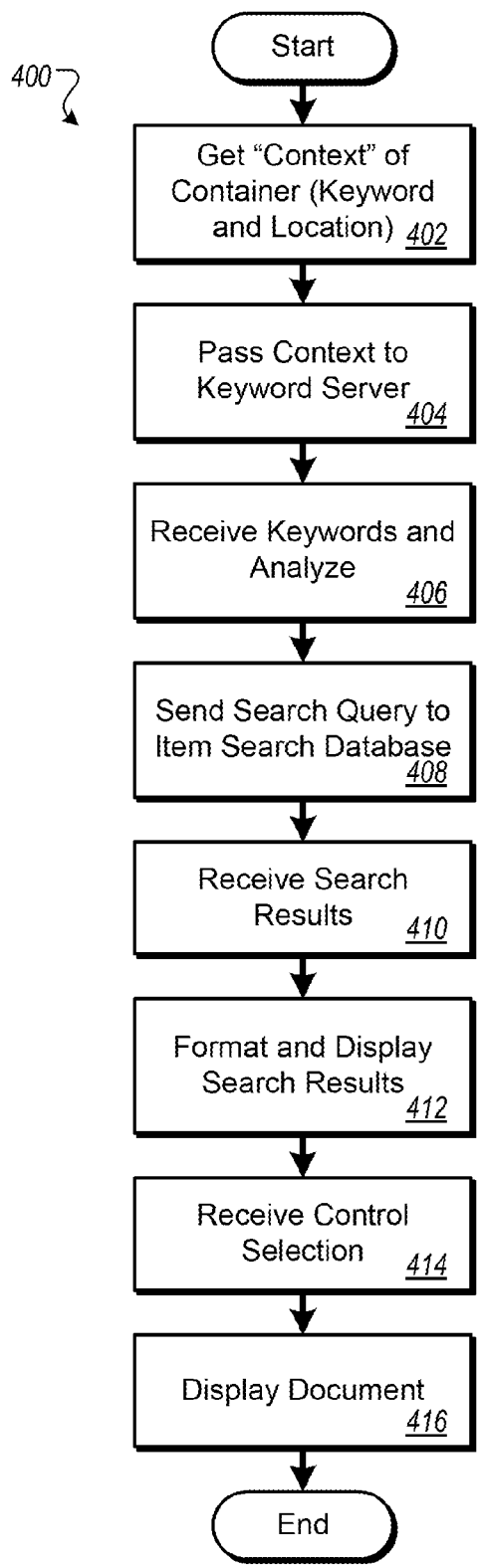
FIGS. 4A and 4B are flow charts of processes for generating an embedded advertisement exhibiting real time data.

FIG. 4A is a flow chart of a process 400 for generating an embedded advertisement exhibiting real time data. In general, the process shows actions that may be taken by an embedded application in gathering and displaying information to a viewer of a web page. The process broadly involves gathering information from a document, such as a container document, related to the embedded application, submitting the gathered information (or a derivative of the gathered information) to a remote server, receiving information from the remote server in response (e.g., information providing information that is descriptive of the related document), submitting the received information (or a derivative of the received information) to another remote server, receiving information in return from the other remote server, and displaying the received information in a specially formatted manner.

At box 402, the embedded application initially obtains information about a "context" of the embedded application and/or a container document for the embedded application. The context may include many different sorts of information, and may include, for example, text of a main heading in the container document, an address such as a URL for the container document, a set of links in the container document, etc. Context information outside the document may also be gathered, such as information about a user of a device that displays the document. Such information may be gathered, for example, using GPS, by asking the user directly, by checking a cookie that was written after the user was asked their location, by triangulation within cell towers, by looking up an IP address for a device that has previously been correlated with a location, by eLORAN, or by other such mechanisms.

The embedded application then, at box 404, passes some or all of the context information to a remote server such as a keyword server. The embedded application may first alter or otherwise reformat the context information, such as by adding certain parameters to the information, where the parameters may be used by the remote keyword server to determine what actions to take with respect to the submitted information. The keyword server may use the passed information to generate a response, such as by identifying information that is descriptive of a container document when a URL of a container document is passed to the server. The keyword server may then pass back such information, such as in the form of keywords, to the embedded application, as shown by box 406.

At box 408, the embedded application sends the keywords to an item search database. The embedded application can analyze the received keywords, and may add to them, alter them, or simply pass them on without any change other than perhaps a formatting change (e.g., from XML to HTTP request that matches an API for the item search database). In addition, the embedded application may make other determinations, such as by selecting an item search database, from multiple such databases, to receive the query. The embedded application may then wait while the item search database applies the submitted query to its data and generates a response. The response may include, for example, one or more items responsive to the query.

At box 410, the embedded application receives the results from the item search database, and at box 412, it formats and displays the search results. The formatting may include eliminating certain of the results for display, and also determining the form or size of the space for the embedded application and arranging information regarding the returned items so as to fit in the allotted space (e.g., in an iFrame having certain dimensions). In addition, the formatting may include incorporating received data into programmed objects, such as incorporating location data into a map.

The embedded application may then wait for an action. At box 414, the embedded application receives a control selection, such as by a user clicking on a hyperlink representing an item displayed by the embedded application. The selected hyperlink may cause a browser that is displaying the embedded application to display to the user a detail page (either in the frame for the embedded application or in a new pane or window) that is the target of the selected hyperlink. By this process, a centrally located embedded application may coordinate the passing of information needed to gather data for displaying a dynamically rendered advertisement, and to display such an advertisement for interaction with a user.

Figure 4B:
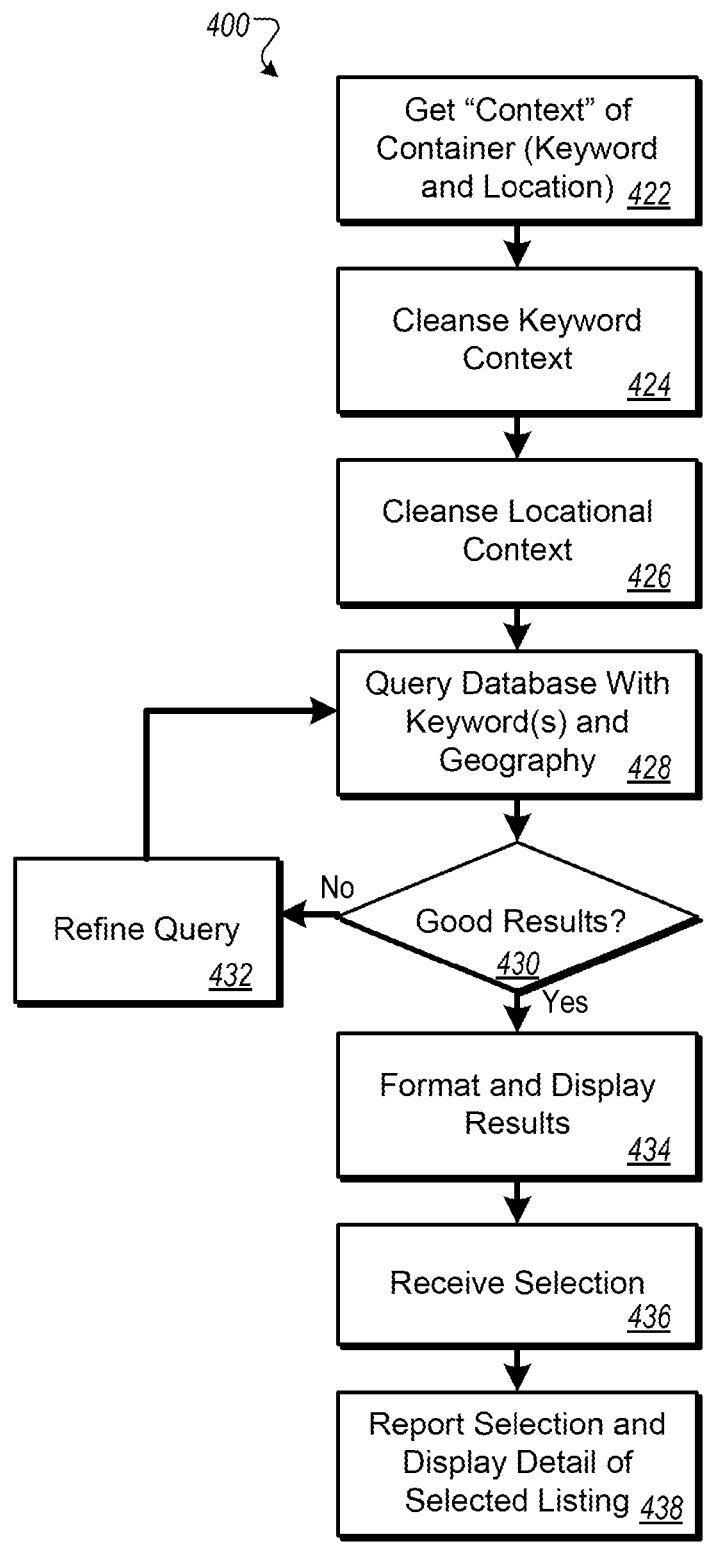

FIG. 4B is a flow chart of a process 420 for generating an embedded advertisement exhibiting real time data. The process 420 is similar to process 400 but includes additional steps for reformatting and resubmitting requests for data to be used in an advertisement.

At box 422, an embedded applications served on a web page (e.g., a gadget or an ADS BY GOOGLE element) obtains information that describes its context, including information about the application's container document and information about the device on which the application is running, such as a location of the device. In one implementation, the information may be received as keywords for a page provided from the container page itself, such as in text of the page or in a special keyword element that was provided by an author of the page. In another implementation, the keywords may be provided by a "wrapper," such as GOOGLE ADSENSE, between the application and the containing page. And in another implementation, the keywords may be provided by a third party (e.g., GOOGLE ADSENSE server) that the application can contact, and pass the ID of the URL for the container document.

The collected context can also include collection of the user's location. In one implementation, the location may be provided from the containing page, so that the advertisement is targeted to a locational topic of the page. For example, if the page is from a travel site that contains a travelogue of Rome, the locational topic may be "Rome." If no locational topic can be determined for the page, a location of the user or device may be used. In another implementation, the keywords may be provided by a "wrapper," such as GOOGLE ADSENSE, between the application and the containing page. And in another implementation, the location may be provided by a third party (e.g., GOOGLE ADSENSE server) that the application can contact, and pass the ID of the user or her connection (e.g., IP address).

At box 424, the embedded application "cleanses" the keyword context. For example, the application may normalize the context by converting one keyword into another, either to generalize a topic, correct spelling, normalize capitalization, handle stemming, etc. In addition, or alternatively, the application can apply the keywords to a blacklist (e.g., to remove words that are not allowed, such as pornographic terms) and/or to a whitelist (to identify words that are "strong" and thus should override other words, such as [mercedes benz slr mclaren] being overridden by [mercedes benz]). As with the prior steps, cleansing can occur in the containing page or wrapper, or after an embedded application is invoked.

At box 426, the process cleanses the location context. For example, the process may use fuzzing, or intentional reduction of geo precision (e.g., to preserve user privacy or increase the number of matching results). Alternatively, or in addition, the process may use shifting, or intentional selection of a nearby center point that better represents data in the database, e.g., moving the point inland from water.

At box 428, the application queries a remote database with the keywords and the geographical context, or location information. If the returned results are determined to be sufficient (e.g., there are not too many or too few results as measured against predetermined limits) (box 430), then the application may render the results (box 434), such as in the form of an interactive advertisement.

If there are not enough results (box 430), then the application may automatically refine its query to obtain additional results via additional calls to the database. Such refinement may occur in various ways, including by refining the query sequentially by the following discrete changes either individually or in combination: (1) expanding the geographic range of the query, e.g., from 10 to 50 miles; (2) using broader keywords, e.g., from [2002 bmw 325i] to [bmw 325i] to [bmw]; (3) shifting the geo center point, e.g., from Long Island to New York City; (4) trying related keywords, e.g., from [bmw] to [Mercedes] on the theory that people might generally like German cars; (5) trying no keywords at all, e.g., taking all listings in NYC; (6) trying no geo restrictions at all, e.g., all [bmw 325i]'s; or (7) trying a default search, e.g., all listings by, for example, popularity or new-ness of the listing. The particular order may be chosen, as above, to gradually increase the scope of the query in a logical manner.

A query may also conduct a fallback in other manners. For instance an automotive query may fall back as follows:

[(year) (make) (model) ( . . . other words . . . )] within [20] miles of [location]

[(year) (make) (model) ( . . . other words . . . )] within [100] miles of [location]

[(year) (make) (model)] within [100] miles of [location]

[(make) (model)] within [100] miles of [location]

[(make)] within [100] miles of [location]

[(all listings)] within [100] miles of [location]

[(all listings)] anywhere

The fallback on the distance term may also be eliminated if the search engine being queried inherently uses the user location as a strong ranking signal.

Where a query is refined and submitted multiple times, duplicate results may be filtered out of the final results, such as by comparing city, description, and pricing information of all the listings. When refined results are displayed (box 434), the results from the initial query may be displayed first, with the results from the refinement being displayed lower in a list. The multiple queries may also be run simultaneously, before a decision is made as to whether refinement will be needed. In certain implementations, detail information may be displayed incrementally. For example, where postal codes are initially provided, they may be displayed, and city names may then be gathered and may replace the postal codes in the display as their lookups complete.

After a time, a user may select an element associated with the displayed advertisement (box 436). For example, the user may hover over an element, or may select an item listed in the advertisement. In the latter situation, the application may respond, such as by causing the container document to navigate to a web site associated with the content displayed by the application. Where the content is an advertisement, the selection by the user may also be reported to an ad system so that the selection can be logged for a CPC billing structure (box 438). Other interactions by the user may be handled in similar manners.

Figure 5:
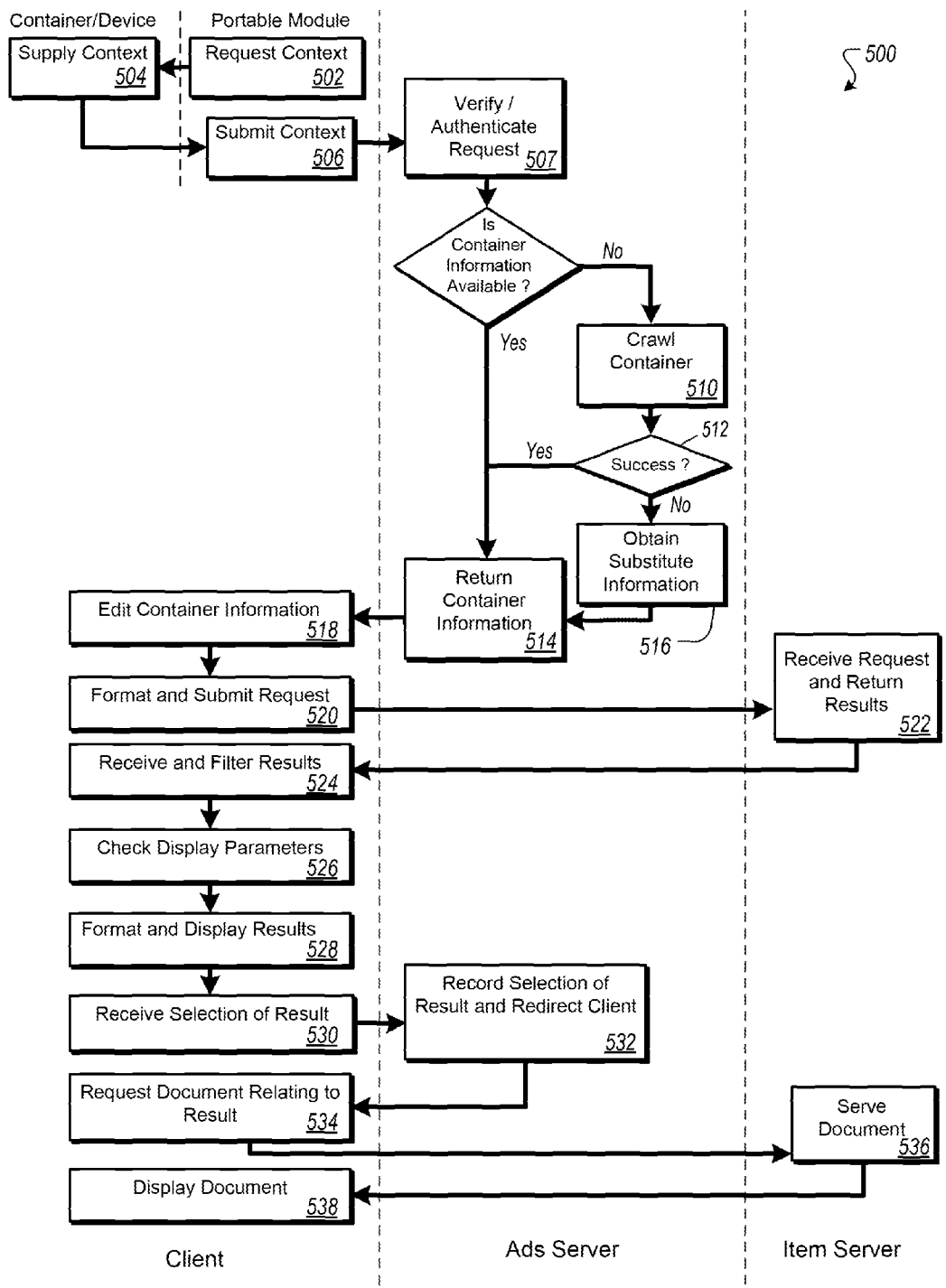
FIG. 5 is a swim lane diagram of a process for generating an embedded advertisement exhibiting real time data.

FIG. 5 is a swim lane diagram of a process 500 for generating an embedded advertisement exhibiting real time data. In general, the process 500 shows an example of interactions between a client device, an ads server, and an item server, which may be structures like those shown in FIGS. 1 and 3.

The example process begins at box 502, where an embedded application on a web page on the client requests information about the context of the web page. The container document or another appropriate structure responds by providing contextual information, such as a URL of the document. The embedded application, which may take the form of a gadget or widget, can also obtain location information for a device on which the module is running and/or a user corresponding to the device. The embedded application then submits information relating to the context (e.g., the URL) to a remote server such as an ads server (box 506).

Upon receipt of the request, the ads server may initially authenticate the request (box 507), such as to ensure it is a valid request. The server then determines whether information that is descriptive of the container document is available, e.g., whether keywords or concepts describing the page content have previously been generated for the document and stored by the server. If such information has been stored, it can simply be returned to the client (box 514). In addition, if a request for the same information has recently been made, a cache may intercept the request and answer it, without the need for additional searching on the server (not shown).

If such information for the container document is not available, the ads server may cause the container document to be crawled by a web crawler (box 510) and then analyzed to generate new keywords in runtime. If crawling and analysis is a success (box 512), the newly generated keywords may be returned to the client (box 514). If the crawling and/or analysis does not generate information that can be returned to the client, the ads server may obtain substitute information for describing the container document (box 516). For example, the ads server may gather keywords for all documents in the same domain or same path as the container document, and identify a particular keyword or keywords that are dominant among the gathered keywords. When substitute information has been gathered, it may be returned to the embedded application as information about the container document (box 514).

At box 518, the embedded application edits the received information, such as by selecting certain keywords to pass to the item server, or by simply reformatting the received information into a request that matches a format that is acceptable to the item server. At box 520, the client finishes reformatting the request and submits it to the item server, which receives the request and returns results corresponding to the request (box 522). The submission may include both keyword information and location information, as was obtained at box 502. The item server may operate according to the various procedures discussed above or according to other appropriate processes.

The client then receives the results at box 524 and filters them or otherwise changes them, such as by eliminating certain results that are determined to not display properly with the container document. In making a decision of what results to display, and how to display them, the embedded application may check display parameters, such as the size of an iFrame or similar structure in which the display is to occur (box 526). The client may then format and display the results (box 528), such as is shown in, for example, FIG. 2. Although not shown, the embedded application may also determine that additional, or different results are needed. If such a determination is made, the application may resubmit its query using looser terms, or may submit the query to a different item server. The application may then merge the results from the multiple queries into a single display (box 528).

After a time, a user may select one of the results displayed by an embedded application (box 530), which may cause an HTTP request to be delivered to the ads server (box 522) where the hyperlinks for the items are formatted to be directed to the ads server. The ads server may then redirect the user's client application (e.g., browser) to the item server (boxes 532 and 534). By having the item's hyperlink point to the ads server, and pointing the browser to the item server by redirection rather than directly, the process 500 may give the ads server notice that the item has been clicked on, so that the ads server may bill the advertiser for the click. In other circumstances, the advertising may be billed differently, such as by a cost per impression billing technique.

At box 534, the client requests a document relating to the result returned by the ads server. The requested document may be a document generally, or may more specifically involve submitting a query to the item server. The item server may then serve the requested document (box 536), which serving may involve querying a database of real-time changing information, and returning matching items from the database. Finally, at box 538, the client displays the document, which may involve formatting XML-based data received from the item server for display on a web page, such as in a gadget.

Figure 6:
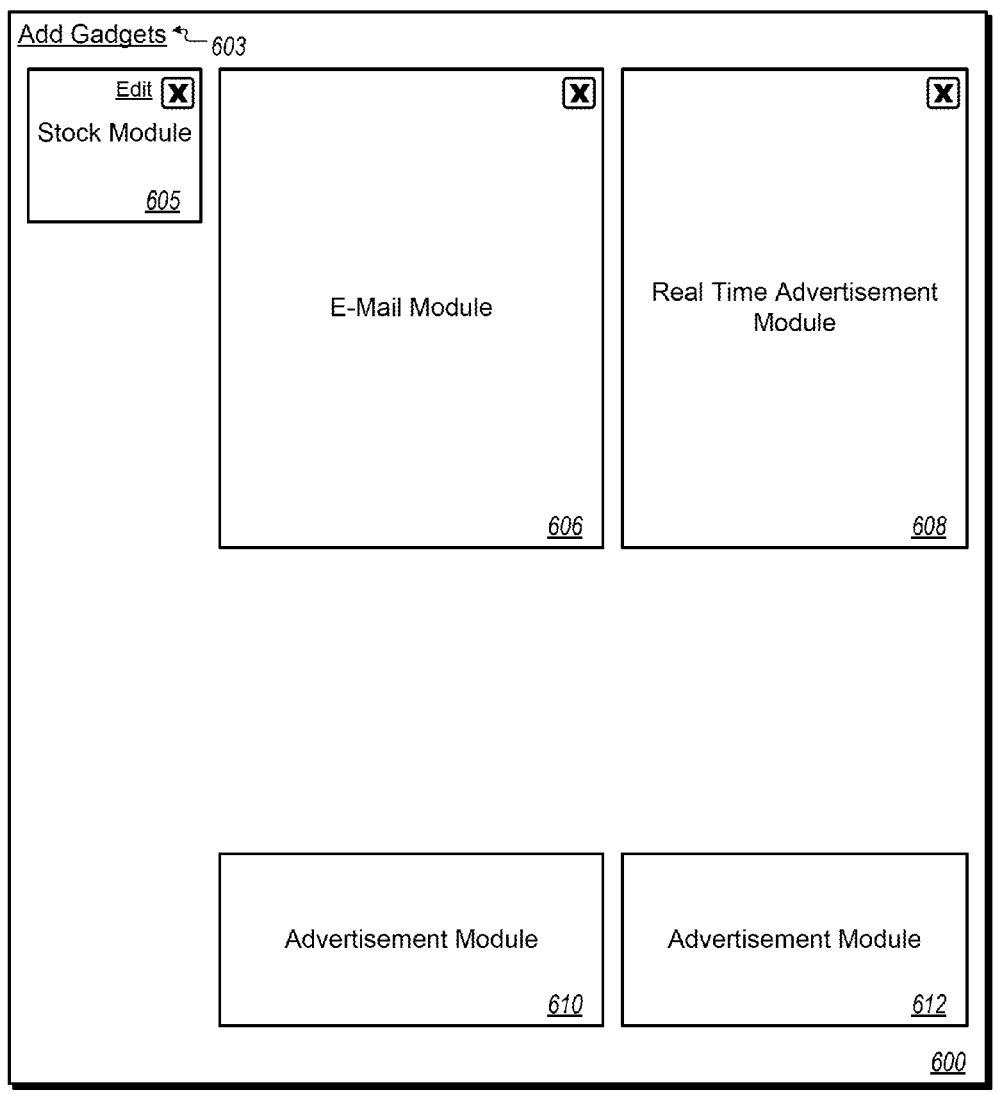
FIG. 6 shows an example layout of a container document that includes a number of embedded applications.

FIG. 6 shows an example layout of a container document 600 that includes a number of embedded applications. A number of methods of incorporation are possible, including the use of the iFrame and inline HTML techniques. FIG. 6 depicts a plurality of modules including a stock module 605, an e-mail module 606, a real-time ad module 608, and ad modules 610, 612. Different formats for the various modules may exist depending upon the specifications provided by the creator of the module. Some modules may provide scroll bars, and others may not. Some modules may be different sizes or shapes than other modules. In addition, some modules may offer an opportunity for the user to edit the display preferences and/or per-use data associated with the module.

In one implementation, in-lined modules may be automatically sized by a container document so that no scrolling, height or scaling information may be provided.

If a module developer wants the module to have these properties in this embodiment, an in-lined module may be wrapped with a fixed size <DIV> tag and content placed in the tag. The scroll bar, height, and other characteristics may be then specified for the inlined content. One of the attributes allows specifying scaling="..." to let the developer indicate how a module may be scaled up or down for different sizes of placements in the container documents.

One of the functions provided with this example container document 600 is the opportunity to add content to the container page through selecting the add content element 603. Upon selecting the "add content" element 603, the system may offer the user the opportunity to interactively indicate an additional element to be included in the container page. Various forms of an interface to receive that input may be provided.

In addition, in adding, editing or deleting modules, it may be desired to have those activities occur without a refresh of the container document. One illustrative technique for achieving this may involve use of AJAX programming techniques so a module may be added to a container document without a refresh of the container document page (perhaps only a refresh of the iFrame in which the new container is presented), or use of AJAX to remove a module without the container document being refreshed or when a developer is developing a module, being able to change modules without the container document in which they are populated having to have a page refresh in order to incorporate the changed module.

Figure 7:
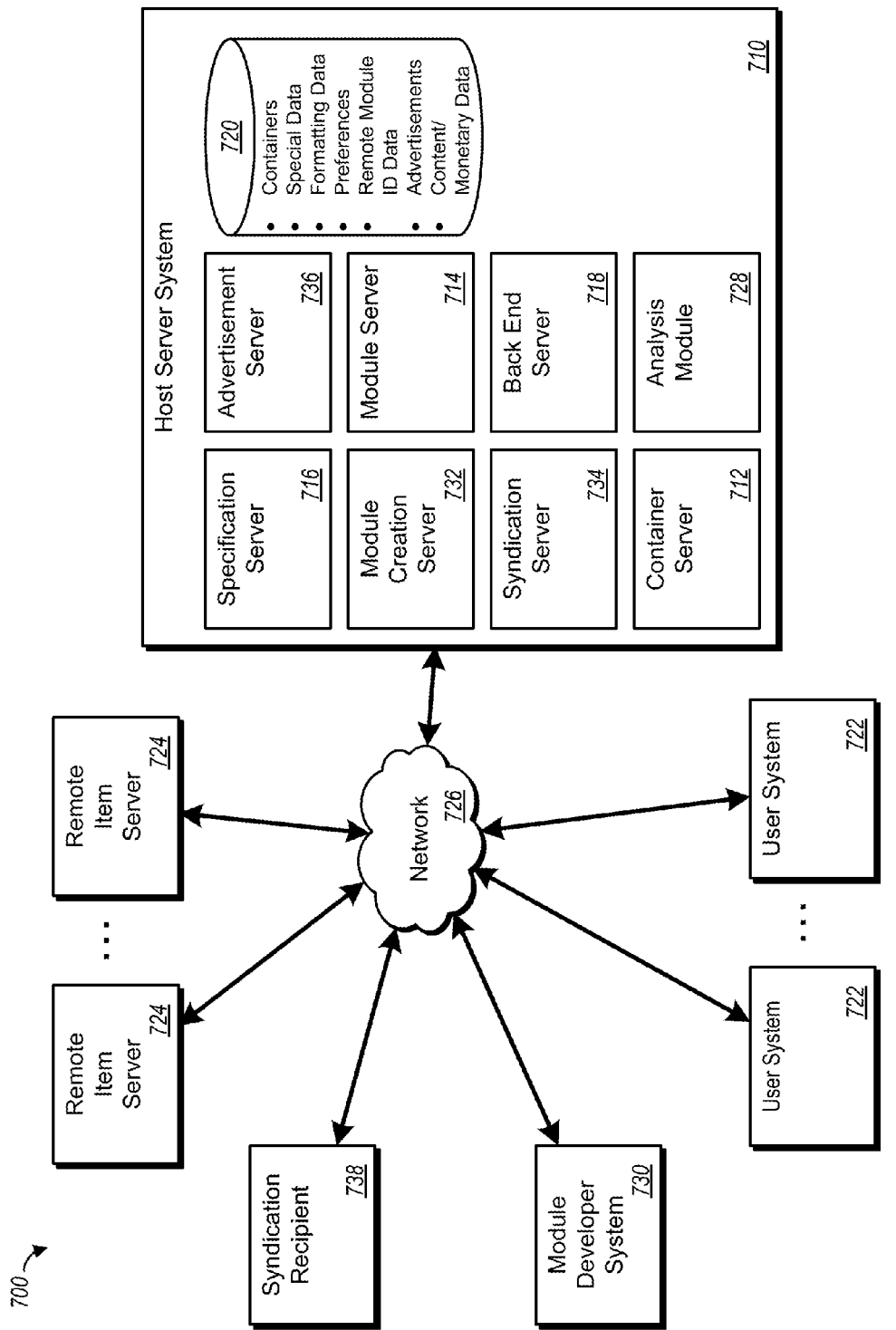
FIG. 7 is a schematic diagram of an example system for dynamically generating advertisements and other items.

FIG. 7 is a schematic diagram of an example system 700 for dynamically generating advertisements and other items. In general, the system 700 is a more general representation of a system that employs embedded applications, such as gadgets, for various operations. The general operations described here are, when appropriate, applicable to the systems shown in FIGS. 1 and 3. System 700 may include a host server system 710 with a plurality of modules that may be associated therewith. Such modules may comprise a container server 712, a module server 714, a specification server 716, a back end server 718, an analysis module 728, a module creation server 732, a syndication server 734, and an advertisement server 736. As illustrated, host server system 710 may connect over a network 726 to a plurality of other systems or sub-systems.

Other systems connected to the network may comprise one or more user systems 722, one or more remote item servers 724, one or more module developer systems 730 and one or more syndication recipient servers 738. In addition, one or more database systems 720 may operate in conjunction with the various modules of host server system 710.

Container server 712 may serve container documents to user systems 722 over network 726. Container server 712 may use a web server or related server systems that take data and/or instructions and formulate containers for transmission over the network to the user system 722. However, that container server 712 may reside on user system 722 as well, so that a network connection may not be used. In the example in which the container document includes a word processing document, for example, container server 712 may comprise a word processing module.

Module server 714 may provide data from modules to container server 712 for incorporation into a container document. In one embodiment, container server 712 and module server 714 may comprise a single unit performing both functions, as may other servers and modules described herein. Module server 714 may provide data for the container document by interpreting and/or parsing instructions in a module specification associated with the module. According to one embodiment, module server 714 may serve the module content to the container document through the use of a browser iFrame.

To expedite display of container documents, modules may be displayed inline within the container document. Inline display may be understood as referring to display with other document elements. One example is a display generated from code for HTML in the body according to HTML standards. In one embodiment, module server 714 or some other component may determine whether the module is deemed trusted prior to including it in the container document due to the risks of various security issues an inline module could create. According to one embodiment, the module may incorporate an indicium of approval (e.g., digital certificate) issued by the container module or an entity associated with the container module. If the indicium of approval is present, module server 714 may render the data from a module for inline presentation in the container document.

Specification server 716 provides a module specification file to module server 714. The module specification may be cached and stored in a database accessible to the module server 714 and/or specification server 716 or may be retrieved from a location associated with the specification as detailed later. For example, specification server 716 may reside on a remote item server 724. In addition, specification server 716 may be connected to module server 714 over a network with the module specification located at another location on the network accessible to specification server 716.

Backend server 718 may be provided for interacting with one or more databases (e.g., large or dynamic databases of information). For example, for a news module that obtains frequent updates and demands a flow of data, (e.g, from an RSS feed), backend server 718 may format the data into HTML for the container.

In one specific example, a person may create a module (e.g., a maps module), such as one that uses an application program interface (API) to an existing mapping program to create a module to display a map of downtown Mountain View, Calif. The module may include an XML specification file or module specification file stored on a specification server. The specification server may comprise any appropriate server, including one on a site from which the container page is hosted. The user or another person may then include this new module on a personalized homepage or another form of web page (container document). The server that serves the container document may operate as the module server, and the server that generates the mapping data through an inquiry from its API may be considered to be the backend server.

In one implementation, analysis module 728 may analyze modules at various times (e.g., when the module is first selected by a user, each time the module is called by a container for inclusion or at any other time determined to be advantageous for safety and security and other times). Analysis module 728 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module.

Analysis module 728 may take one or more actions in response to a determination that the module is disapproved or dangerous, including, for example, silently blocking the request, (i.e. providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 128 may parse the module content to determine whether it is safe, such as by compiling JavaScript or other scripts contained in the module to try to identify unsafe or undesired actions the module may perform.

One or more module creation servers 732 may be provided. These servers may operate as "wizards" to enable module creators to create a module through an interactive process. For example, module creation server 732 may provide a series of user interfaces that enable a person creating a module to provide inputs that are used to automatically generate a module specification. For example, various module specification templates may be provided with corresponding inputs. Module creation server 732 may then take inputs supplied by a user, insert them into a template, and generate a module specification for the module. A preview, testing, and debugging function may also be offered as part of these "wizards." This module may be downloadable to a client as well.

A syndication server 734 may prepare data for transmission to one or more syndication recipient servers 738 related to modules. Syndication server 734 may receive a request for a module and/or module content and deliver that module or content to a syndication recipient server 738 over network 726. Syndication server 734 may reside at host server system 710 or at another location on the network.

For example, if an operator of a sports web site (an example of a syndication recipient system1 738) desires to include an advertising module created by a remote source system 724, it may do so through a request to syndication server 734. Syndication server 734 may then cooperate with module server 714 to generate data for the container document (here the sports web site page of the syndication recipient system 738). That may involve retrieving the module specification from remote source system 724, supplying preferences received from the syndication recipient server 738 (e.g., city information for the sports team of a page being displayed) and/or generating data for the container. It is also possible that the data may be rendered at syndication recipient server 738 into its container document in either an iFrame or inline. Syndication server 734 may thus syndicate modules accessible to it. It may do so based on requests for specific modules or other criteria it determines (e.g., content matches, keyword matches, monetary values associated with modules and/or syndication requestors, etc.).

Ad server 736 may provide advertisements associated with modules to containers and/or data for creating a display for such modules. For example, an advertisement may be incorporated with module data when data is delivered to a container document. Ad server 736 may operate with syndication server 734 to deliver advertisements to syndication recipient servers 738 based on a syndication request for a module. The advertisements may be selected by ad server 736 based on a wide variety of criteria, including, but not limited to, the relationship between the content of or information about the container, module, other modules in the container, syndication recipient server information, monetary elements/relationships related to any of the foregoing and/or combinations thereof. Ad server 736 may comprise the GOOGLE ADSENSE system, according to one embodiment.

Specifically, ad server 736 may manage online advertising by associating two or more concepts related to a module with an advertisement and associating a bid, collectively, with the two or more keywords. In addition, syndication server 734 or ad server 736 may respond to requests from syndicated modules such as advertising-related modules that send requests for information describing container pages associated with the modules.

One or more database systems 720 may be provided that store, in any number of appropriate manners, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, the data may be stored at a number of locations and in one or more systems.

In one implementation, systems and method are provided to incorporate modules into a container document. One example of a container document would be a personalized home page, such as the GOOGLE PERSONALIZED HOMEPAGE currently available to users of the GOOGLE services on the Internet. Instead of restricting the types of content that a user is able to include in a container document such as a personalized home page, one or more embodiments of the present invention enable users to select modules from sources other than the source of the container document. So, for example, a user may elect to include a module in his or her personalized GOOGLE home page from a source not associated with GOOGLE.

Figure 8:
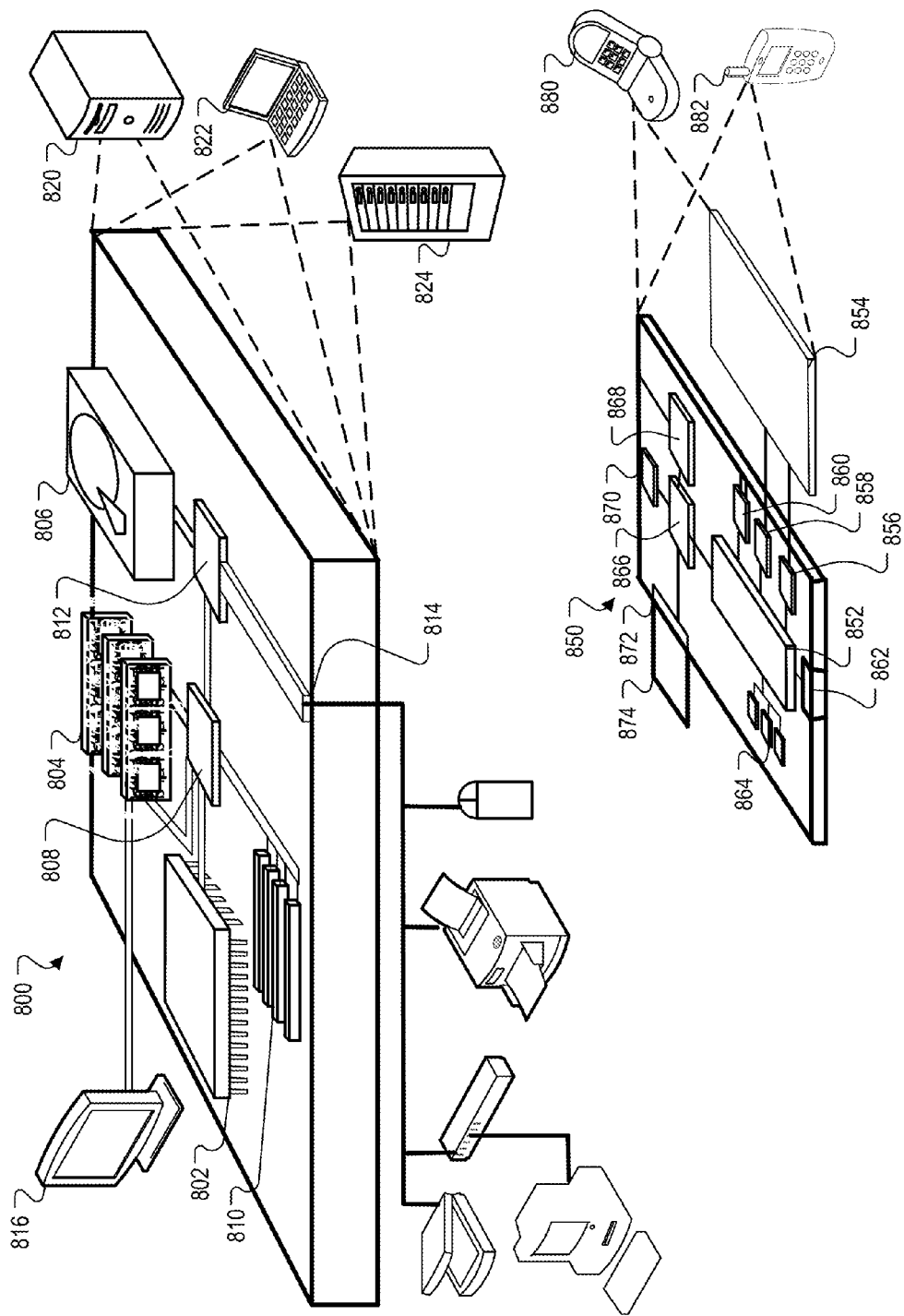
FIG. 8 shows an example of a computer device and a mobile computer device that can be used to implement the techniques described here.

FIG. 8 shows an example of a computer device 800 and a mobile computer device 850 that can be used to implement the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, container document 102 MA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although much of the description above focuses on the delivery of listing information from a listing service such as an on-line auction service, the particular things being advertised may be services and could be used both inside and outside auction-based systems. Moreover, although many of the embodiments have been described in relation to real time, dynamically created advertisements, other content delivery may also be provided in other various forms, including non-advertisement-based content. Accordingly, other embodiments are within the scope of the following claims.

What is claimed is:

1. A computer-implemented method, comprising:
generating, using an embedded client application, a keyword context for a container document holding the embedded client application;
generating, using the embedded client application, a geographic context associated with a device on which the container document is displayed;
submitting the keyword context and the geographic context to a remote server; and
displaying an interactive application using information obtained in response to the submission of the keyword context and geographic criteria.

2. The method of claim 1, wherein the container document comprises a web page and the embedded client application runs in an iframe on the container document.

3. The method of claim 1, where the remote server comprises a item search system that returns information about items for sale, wherein the items correspond to the submitted keyword context and are sold in or near an area corresponding to the submitted geographic context.

4. The method of claim 1, wherein generating the keyword context comprises submitting information about the container document to a remote keyword server.

5. The method of claim 4, wherein the information about the container document comprises a URL for the container document.

6. The method of claim 1, wherein generating a geographic context comprises obtaining a current location indicator for the device.

7. The method of claim 1, wherein the remote server comprises an ad server that provides advertising content targeted at particular keywords and locations.

8. The method of claim 7, further comprising displaying information about a plurality of active databases and permitting a user to select a database listing to be taken to a listing detail page at the remote server.

9. The method of claim 1, further comprising submitting information about the container document to a remote keyword server and analyzing the information obtained in response to the submission to the remote keyword server, and submitting alternative information to the remote keyword server if the analysis indicates that the information obtained is inadequate.

10. The method of claim 9, wherein the alternative information comprises the original information, submitted to a second remote keyword server.

11. The method of claim 9, further comprising combining information received in response to submissions to multiple keyword servers.

12. The method of claim 1, wherein submitting the keyword context and geographic context comprises submitting multiple related queries to a remote server, and wherein displaying an interactive application comprises rendering query results incrementally and at least in part substantially concurrently with the submission of one or more of the multiple queries.

13. The method of claim 12, wherein the multiple related queries comprise queries to refine prior results for updated display.

14. The method of claim 13, wherein the queries to refine prior results are performed asynchronously with respect to each other.

15. The method of claim 14, wherein the queries to refine prior results comprise follow-up queries that delete search terms from prior queries.

16. The method of claim 1, further comprising cleansing the keyword context by applying normalization, whitelisting, and/or blacklisting.

17. The method of claim 1, further comprising cleansing the geographic context by applying reduced resolution or shifting to the geographic criteria.

18. A recordable media having recorded and stored thereon in tangible form, instructions that, when executed, perform actions comprising:
- generating, using an embedded client application, a keyword context for a container document holding the embedded client application;
- generating, using the embedded client application, a geographic context associated with a device on which the container document is displayed;
- submitting keyword and geographic parameters associated with the keyword and geographic contexts to a remote server; and
- displaying an interactive application using information obtained in response to the submission of the keyword and geographic parameters.

19. The recordable media of claim 18, wherein the media further stores instructions that, when executed, generate a keyword parameter by identifying an address for the container document and submitting the address to a remote topical server that catalogues topics for container pages.

20. The recordable media of claim 18, wherein the media further stores instructions that, when executed, display information about a plurality of live auctions and permit a user to select an auction listing to be taken to an auction detail page at the remote server.

* * * * *